(12) United States Patent
He et al.

(10) Patent No.: US 11,973,429 B2
(45) Date of Patent: Apr. 30, 2024

(54) RESONANT TANK CIRCUIT AND METHOD FOR CONFIGURING RESONANT TANK CIRCUIT

(71) Applicant: Valeo Siemens eAutomotive (Shenzhen) Co., Ltd., Shenzhen (CN)

(72) Inventors: Chen He, Shenzhen (CN); Gang Yang, Courbevoie (FR)

(73) Assignee: Valeo Siemens eAutomotive (Shenzhen) Co., Ltd.

( * ) Notice: Subject to any disclaimer, the term of this patent is extended or adjusted under 35 U.S.C. 154(b) by 152 days.

(21) Appl. No.: 17/785,681

(22) PCT Filed: Dec. 17, 2019

(86) PCT No.: PCT/CN2019/125966
§ 371 (c)(1),
(2) Date: Jun. 15, 2022

(87) PCT Pub. No.: WO2021/119999
PCT Pub. Date: Jun. 24, 2021

(65) Prior Publication Data
US 2023/0048674 A1 Feb. 16, 2023

(51) Int. Cl.
*H02M 3/335* (2006.01)
*H02M 1/00* (2006.01)
(Continued)

(52) U.S. Cl.
CPC ..... *H02M 3/33584* (2013.01); *H02M 1/0064* (2021.05); *H02M 3/01* (2021.05); *H02M 3/33592* (2013.01); *H02M 3/3376* (2013.01)

(58) Field of Classification Search
CPC ......... H02M 3/33584; H02M 3/33592; H02M 3/3376
See application file for complete search history.

(56) References Cited

U.S. PATENT DOCUMENTS 9,812,977 B2 * 11/2017 Ye ..................... H02M 3/33592
10,340,809 B2 7/2019 Boysen
(Continued)

FOREIGN PATENT DOCUMENTS

CN 104811049 A 7/2015
CN 204615654 U 9/2015
(Continued)

OTHER PUBLICATIONS

Extended European Search Report issued in European Application No. 19956814.8, dated Sep. 7, 2023 (7 pages).
(Continued)

*Primary Examiner* — Gary A Nash
(74) *Attorney, Agent, or Firm* — Osha Bergman Watanabe & Burton LLP

(57) ABSTRACT

The resonant tank circuit (102) comprises: a transformer (T); a primary circuit (M1); and a secondary circuit (M2); wherein the transformer (T) and the primary and secondary circuits (M1, M2) are designed to operate in a forward mode and in a reverse mode; and wherein the transformer (T) and the primary and secondary circuits (M1, M2) have, at a resonant frequency ($F_R$), a forward gain ($G_F(F_R)$), respectively a reverse gain ($G_R(F_R)$), essentially independent of the load, when operating in the forward mode, respectively the reverse mode. The primary and secondary circuits (M1, M2) are different one from another and the forward gain ($G_F(F_R)$) and the reverse gain ($G_R(F_R)$) at the resonant frequency ($F_R$) are essentially equal to one another, notably to within 5%.

9 Claims, 6 Drawing Sheets

Figure 1:
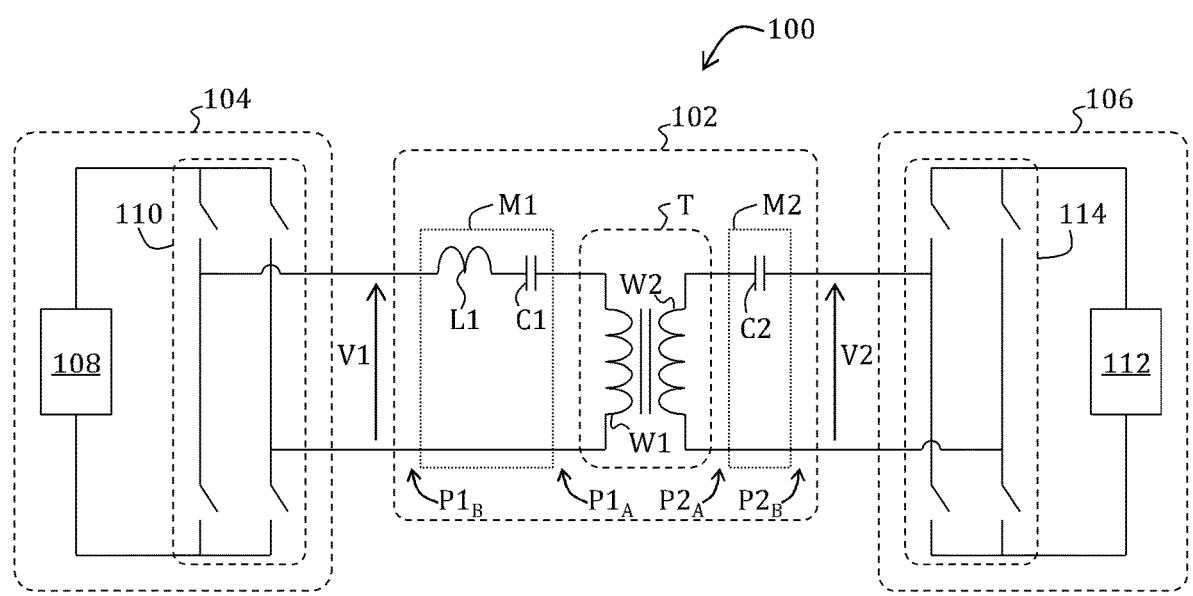

(51) Int. Cl.
     *H02M 3/00*    (2006.01)
     *H02M 3/337*   (2006.01)

(56) References Cited

U.S. PATENT DOCUMENTS

| | | | | |
|---|---|---|---|---|
| 2013/0265804 A1* | 10/2013 | Fu | .................... | H02M 3/33576 363/17 |
| 2014/0133190 A1* | 5/2014 | Asinovski | ......... | H02M 3/33592 363/21.03 |
| 2016/0094141 A1 | 3/2016 | Petkov et al. | | |

FOREIGN PATENT DOCUMENTS

| | | | | | |
|---|---|---|---|---|---|
| CN | 109245593 | A | | 1/2019 | |
| CN | 110198126 | A | | 9/2019 | |
| KR | 20180004675 | A | * | 1/2018 | ............ H02M 3/335 |
| WO | WO-2018141092 | A1 | * | 8/2018 | ............ H02M 1/083 |

OTHER PUBLICATIONS

Office Action issued in counterpart Chinese Application No. 201980017931.3, dated Jun. 10, 2023 (9 pages).

Jung et al. "Design Methodology of Bidirectional CLLC Resonant Converter for High-Frequency Isolation of DC Distribution Systems", IEEE Transactions on Power Electronics, vol. 28, No. 4, Apr. 2013 (15 pages).

* cited by examiner

RESONANT TANK CIRCUIT AND METHOD FOR CONFIGURING RESONANT TANK CIRCUIT

The present invention relates to a resonant tank circuit and a method for configuring a resonant tank circuit.

The article "Design Methodology of Bidirectional CLLC Resonant Converter for High-Frequency Isolation of DC Distribution Systems" by Jung et al., published in IEEE Transactions On Power Electronics, vol. 28, No 4, April 2013, describes a resonant tank circuit comprising:
- a transformer comprising primary and secondary windings magnetically coupled;
- a primary circuit having a first pair of terminals connected to the primary winding and a second pair of terminals intended to be connected to a primary electrical device; and
- a secondary circuit having a first pair of terminals connected to the secondary winding and a second pair of terminals intended to be connected to a secondary electrical device;

wherein the transformer and the primary and secondary circuits are designed to operate in a forward mode, respectively a reverse mode, in which the primary electrical device operates as a primary AC voltage source, respectively a primary load, and the secondary electrical device operates as a secondary load, respectively a secondary AC voltage source; and wherein the transformer and the primary and secondary circuits have, at a resonant frequency, a forward gain, respectively a reverse gain, essentially independent of the primary load, respectively the secondary load, when operating in the forward mode, respectively the reverse mode.

In this article, the primary and secondary circuits are identical and comprise each an inductance and a capacitance in series. Furthermore, the transformer has a winding ratio of 1:1.

In this manner, the resonant tank circuit is structurally symmetrical. This implies that the gain is similar in both directions of operation, which provides some benefits. In particular, when the primary and secondary electrical devices use switches, the same control parameters can be used in both directions of operation.

However, it is sometimes not possible to use a structurally symmetrical resonant tank circuit. For example, in order to limit the number of components due to the limited space and cost consideration, it may be necessary not to provide an inductance on the secondary side of the transformer.

An object of the invention is therefore a resonant tank circuit comprising:
- a transformer comprising primary and secondary windings magnetically coupled;
- a primary circuit having a first pair of terminals connected to the primary winding and a second pair of terminals intended to be connected to a primary electrical device; and
- a secondary circuit having a first pair of terminals connected to the secondary winding and a second pair of terminals intended to be connected to a secondary electrical device;

wherein the transformer and the primary and secondary circuits are designed to operate in a forward mode, respectively a reverse mode, in which the primary electrical device operates as a primary AC voltage source, respectively a primary load, and the secondary electrical device operates as a secondary load, respectively a secondary AC voltage source; and wherein the transformer and the primary and secondary circuits have, at a resonant frequency, a forward gain, respectively a reverse gain, essentially independent of the primary load, respectively the secondary load, when operating in the forward mode, respectively the reverse mode; characterized in that the primary and secondary circuits are different one from another and in that the forward gain and the reverse gain at the resonant frequency are essentially equal to one another, notably to within 5%.

Thanks to the invention, even without symmetrical structure of the resonant tank circuit, the forward gain and the reverse gain are similar.

Optionally, the forward gain and the reverse gain at the resonant frequency are both essentially equal to one, notably to within 5%.

Also optionally, the primary circuit comprises a primary inductance and a primary capacitance in series.

Also optionally, a winding ratio of the primary and secondary windings is essentially equal to, notably to within 5%:

$$N = \frac{Lm + \frac{L1}{2}}{Lm}$$

where N is the winding ratio, Lm is a magnetizing inductance of the transformer across the primary winding and L1 is the primary inductance.

Also optionally, a magnetizing inductance of the transformer across the primary winding is such that:

$$Lm^2 > 100 \cdot \left(\frac{L1}{2}\right)^2$$

where Lm is the magnetizing inductance and L1 is the primary inductance.

Also optionally, the secondary circuit comprises a secondary capacitance.

Also optionally, the secondary circuit has essentially no inductance.

Also optionally, the secondary capacitance is given by:

$$C2 = \frac{C1}{N^2}$$

where C2 is the secondary capacitance, C1 is the primary capacitance and N is the winding ratio.

Another object of the invention is a DC-DC converter comprising:
- a resonant tank circuit according to the invention;
- a primary electrical device connected to the second pair of terminals of the primary circuit; and
- a secondary electrical device connected to the second pair of terminals of the secondary circuit.

Figure 2:
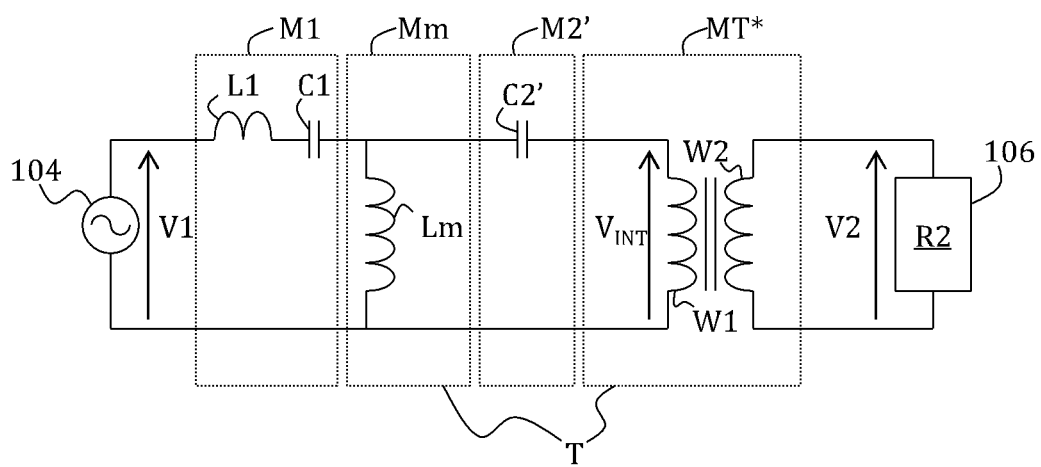
Figure 3:
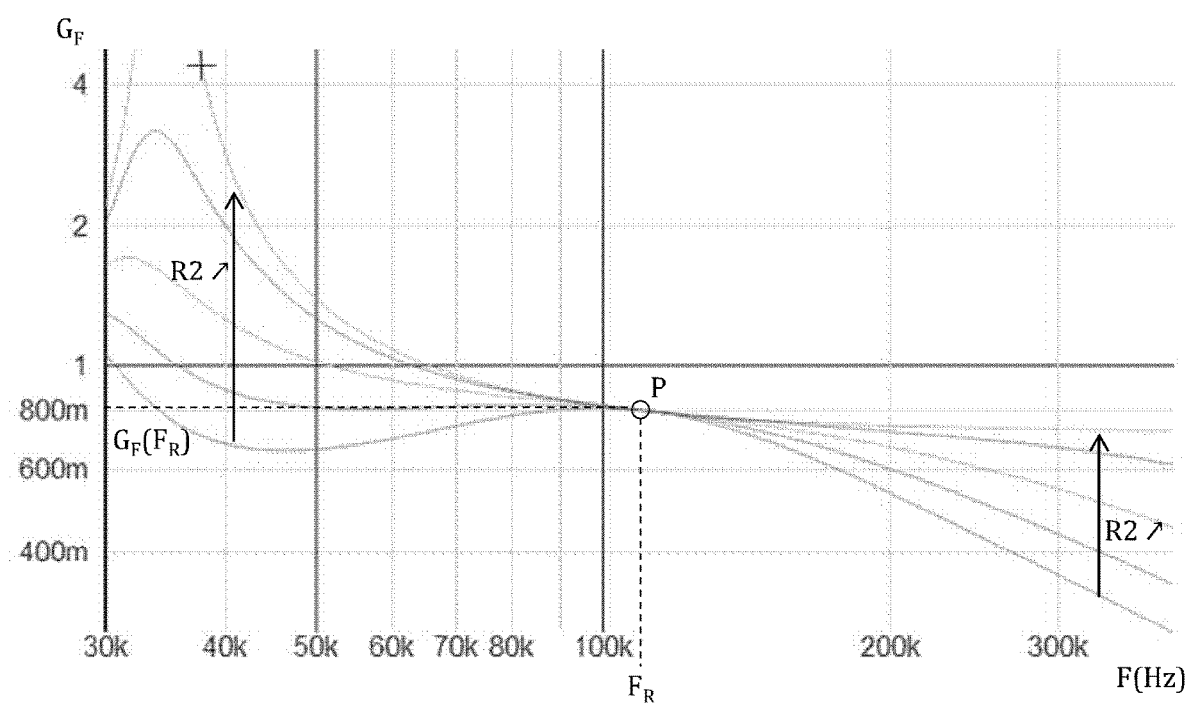
Figure 4:
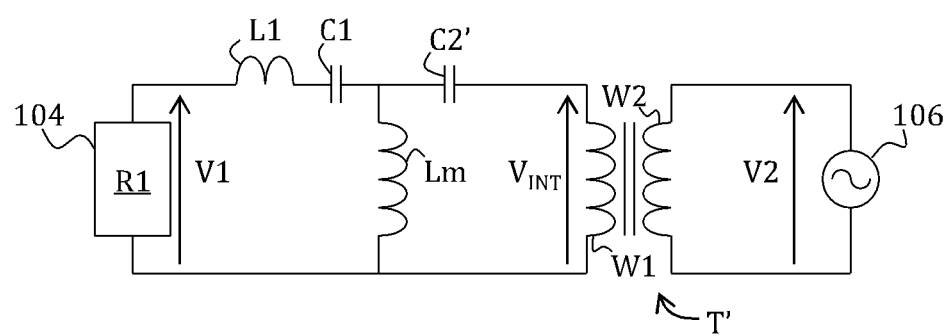
Figure 5:
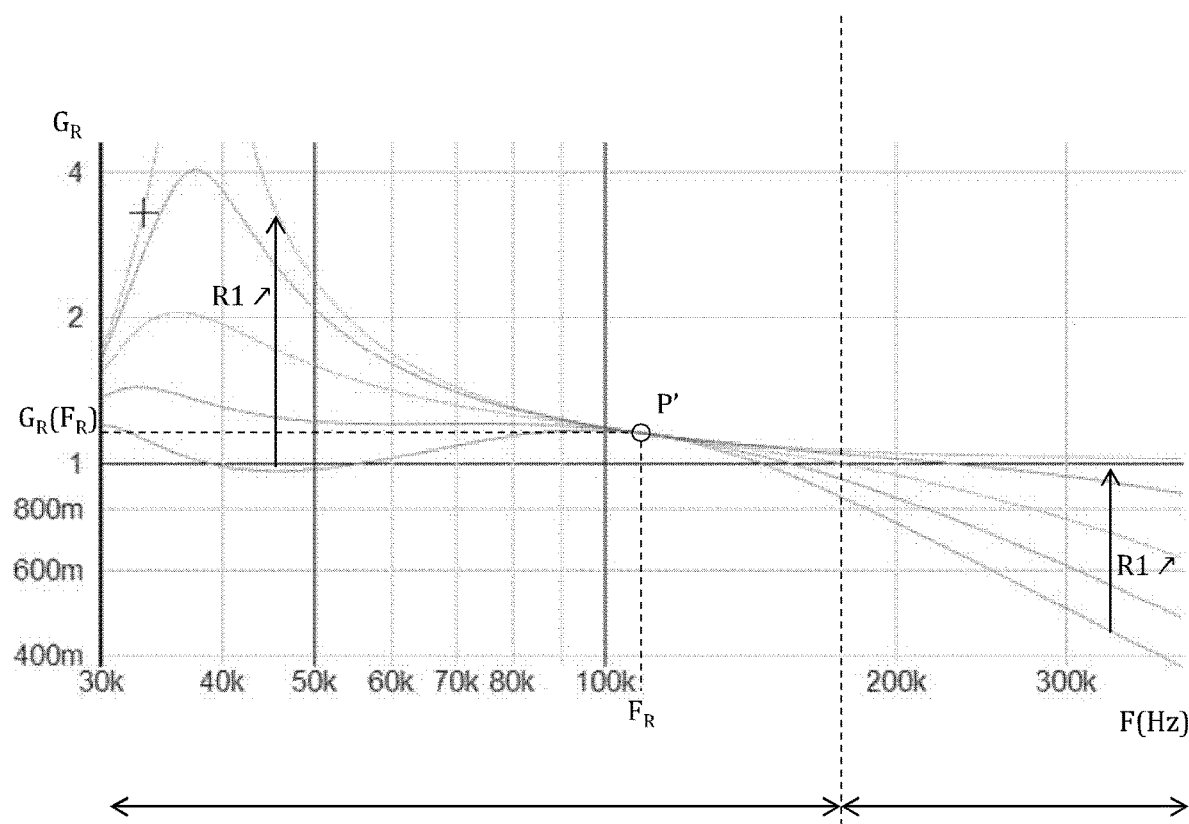
Figure 6:
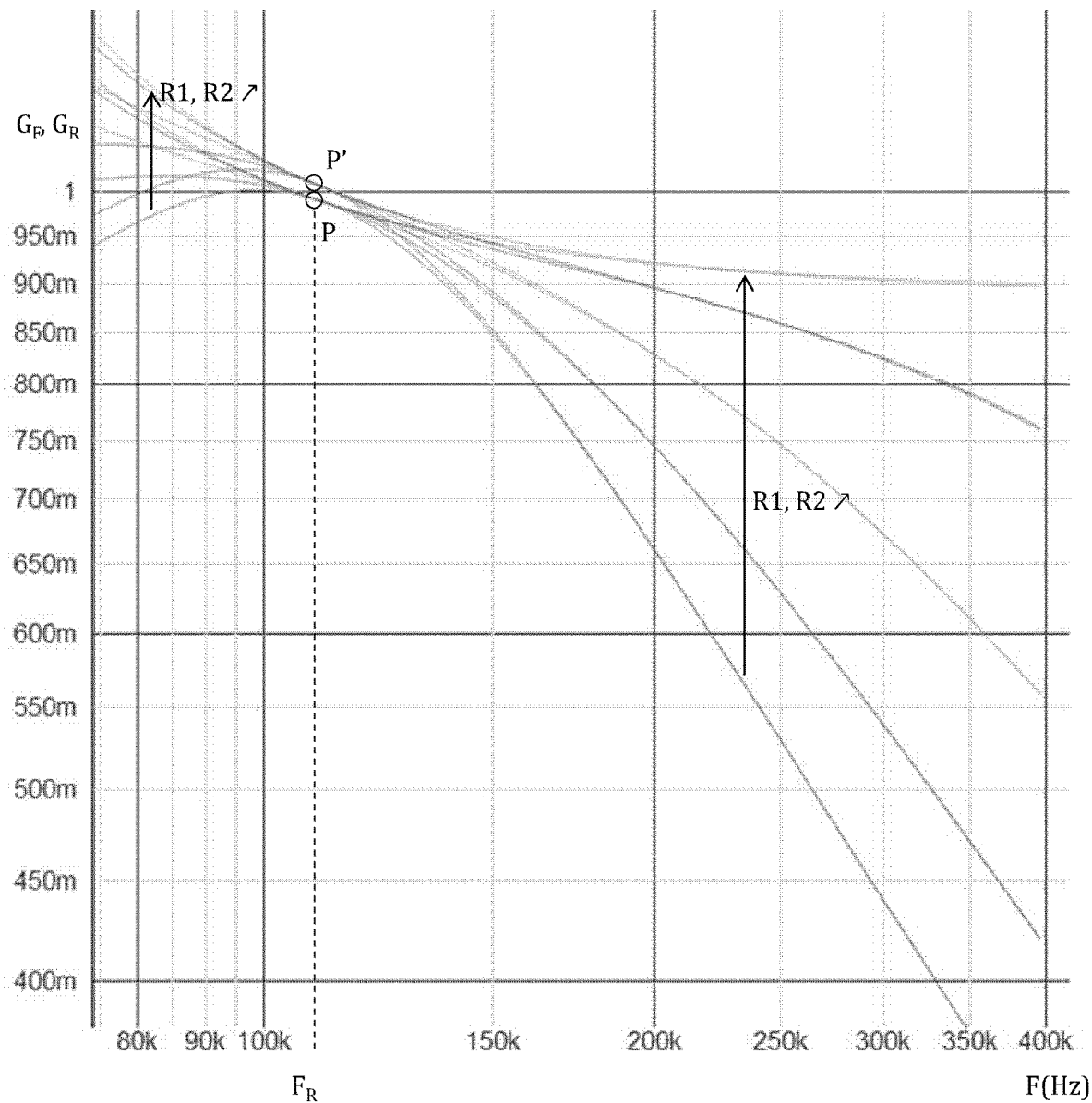

The invention will be better understood with the aid of the description which follows, given solely by way of example and with reference to the appended drawings, in which:

FIG. 1 is an electrical diagram of a bidirectional DC-DC converter according to a first embodiment of the invention, FIG. 2 electrical diagram of a model of a resonant tank circuit of the DC-DC converter of FIG. 1, in a forward mode of operation, FIG. 3 is a set of curves illustrating a forward gain of the resonant tank circuit as a function of frequency, for different loads, FIG. 4 electrical diagram of a model of the resonant tank circuit, in a reverse mode of operation, FIG. 5 is a set of curves illustrating a reverse gain of the resonant tank circuit as a function of frequency, for different loads, and FIG. 6 is a set of curves illustrating the forward gain and the reverse gain as a function of frequency, for different loads, with a winding ratio of a transformer of the resonant tank circuit adjusted.

In the following description, each mentioned inductance comprises for example one or several inductors, for example connected to each other in series and/or in parallel. Similarly, each mentioned capacitance comprises for example one or several capacitors, for example connected to each other in series and/or in parallel.

Referring to FIG. 1, a bidirectional DC-DC converter 100 according to the invention will now be described.

The DC-DC converter 100 first comprises a resonant tank circuit 102.

The resonant tank circuit 102 first comprises a transformer T comprising primary and secondary windings W1, W2 magnetically coupled. The primary and secondary windings W1, W2 have respectively N1 and N2 turns, so that the transformer T has a winding ratio N given by:

$$N = \frac{N2}{N1}$$

The resonant tank circuit 102 further comprises a primary circuit M1 having a first pair of terminals, called port P1$_A$, connected to the primary winding W1 and a second pair of terminal, called port P1$_B$, where, in operation, a primary AC voltage V1 is present. The primary circuit M1 comprises one or several primary components arranged according to a primary layout. In the described example, the primary circuit M1 is a series impedance having a primary inductance L1 and a primary capacitance C1 in series.

The resonant tank circuit 102 further comprises a secondary circuit M2 having a first pair of terminals, called port P2$_A$, connected to the secondary winding W2 and a second pair of terminals, called port P2$_B$, where, in operation, a secondary AC voltage V2 is present. The secondary circuit M2 comprises one or several secondary components arranged according to a secondary layout. In the described example, the secondary circuit M2 is a series impedance having a secondary capacitance C2, but essentially no inductance. For example, the secondary circuit M2 comprises no inductor so that the inductance only results from stray inductance.

The primary and secondary circuits M1, M2 are different one from another. This means that the primary and secondary circuits M1, M2 are respectively associated with two transmission matrices (also called ABCD matrices) which are different.

The resonant tank circuit 102 is designed to operate as a bidirectional AC-AC voltage converter. More precisely, in a forward mode of operation, the resonant tank circuit 102 is designed to receive the primary AC voltage V1 and to provide the secondary AC voltage V2 with an step up (boost mode) or step down (buck mode) amplitude depending on the frequency of the primary AC voltage V1. In a reverse mode of operation, the resonant tank circuit 102 is designed to receive the secondary AC voltage V2 and to provide the primary AC voltage V1 with a step up (boost mode) or step down (buck mode) amplitude depending on the frequency of the secondary AC voltage V2.

The DC-DC converter 100 further comprises a primary electrical device 104 connected to the second port P1$_B$ of the primary circuit M1 and a secondary electrical device 106 connected to the second port P2$_B$ of the secondary circuit M2. Both electrical devices 104, 106 are designed to selectively operate as an AC voltage source and a load, depending on the mode of operation.

In the described example, one of the primary and secondary electrical devices 104, 106 comprises a DC link 108 with a DC link voltage and an AC-DC conversion circuit 110 for implementing conversion between the DC link voltage and the primary AC voltage V1. The other of the primary and second electrical devices 104, 106 comprises an electrical storage device 112 such as a battery with a DC battery voltage and an AC-DC conversion circuit 114 for implementing conversion between the DC battery voltage and the secondary AC voltage V2.

Each AC-DC conversion circuit 110, 114 comprises for example an H bridge with at least one controllable switch, such as a MOSFET (Metal-Oxide-Semiconductor Field-Effect Transistor). Four controllable switches are illustrated for each AC-DC conversion circuit 110, 114.

In the described example, the forward mode of operation corresponds to a charging of the electrical storage device 112 from the DC link 108, for example when the DC link 108 is connected to an electrical network, while the reverse mode of operation corresponds to a discharging of the electrical storage device 112 to the DC link 108, for example for providing electrical energy to other electrical components connected to the DC link 108.

Referring to FIG. 2, an electrical model of the DC-DC converter 100 in the forward mode of operation will now be described.

In this model, the primary electrical device 104 is modeled by an AC voltage source.

Furthermore, a model of the transformer T first comprises an ideal transformer MT* having the primary and secondary windings W1, W2 with the winding ratio N. An intermediate voltage V$_{INT}$ is present across the primary winding W1. The model of the transformer T further comprises a magnetization circuit Mm connected to the primary winding W1. In the described example, the magnetization circuit Mm comprises a shunt magnetizing inductance Lm present across the primary winding W1 of the transformer T.

The secondary circuit M2 is represented by an equivalent circuit M2' located at the primary side of the transformer T, which will be designated in what follows as referred to primary circuit M2'. The magnetization circuit Mm is therefore connected to the primary winding W1 through the referred to primary circuit M2'. The referred to primary circuit M2' comprises components organized according to a layout. In the described example, the referred to primary circuit M2' comprises a referred to primary capacitance C2' related to the secondary capacitance C2 by:

$$C2' = \frac{C2}{N^2}$$

The resonant tank circuit 102 has a forward gain G$_F$ dependent on the frequency F of the AC voltage source 104 and given by:

$$G_F = \frac{V2}{V1} = N \cdot \frac{V_{INT}}{V1}$$

An example of the forward gain $G_F$ in a resonant tank according to the prior art is illustrated on FIG. 3 as a function of the frequency F for different loads R2 (arrows indicate increase of the load R2), when the referred to primary capacitance C2' is equal to the primary capacitance C1 and the winding ratio N is equal to one.

As it can be appreciated, at a resonant frequency $F_R$, the curves for the different loads R2 meet at a point P, which means that the forward gain $G_F(F_R)$ at the frequency $F_R$ is essentially independent of the load R2. To estimate the forward gain $G_F(F_R)$, the case where R2 is very high is considered. In that case, the intermediate voltage $V_{INT}$ is essentially the voltage across the magnetizing inductance Lm, and a voltage divider is obtained so that:

$$G_F(F_R) = N \cdot \frac{XLm}{XLm + XL1 + XC1}$$

where XLm is the reactance ($2\pi F_R$ Lm) of the magnetizing inductance Lm, XL1 is the reactance ($2\pi F_R$ L1) of the primary resonant inductance L1 and XC1 is the reactance ($1/(2\pi F_R$ C1)) of the primary capacitance C1.

The frequency $F_R$ is a resonant frequency of the resonant tank circuit 102 corresponding to the resonance of the primary inductance L1, the primary capacitance C1 and the referred to primary capacitance C2', in series, so that:

XL1+XC1+XC2'=0 where XL1 is the reactance of the primary resonant inductance L1, XC1 is the reactance of the primary resonant capacitance C1, and XC2' is the reactance ($1/(2\pi F_R$ C2')) of the referred to primary capacitance C2'.

The resonant frequency $F_R$ is therefore given by:

$$F_R = \frac{1}{2\pi\sqrt{L1(C1//C2')}}$$

The choice of the resonant frequency $F_R$ results from a compromise: on the one hand, the higher the resonant frequency $F_R$, the lower the volume of magnetic material needed for the transformer T. On the other hand, the higher the resonant frequency $F_R$, the more power losses and thermal issues in the switches of the AC-DC conversion circuits 110, 114. Generally, the DC-DC converter 100 is preferably designed to operate for example in the range of 75 kHz to 500 kHz. The resonant frequency $F_R$ is preferably in the range of 80 kHz to 300 kHz. More precisely, when CoolMOS™ MOSFET are used in the AC-DC conversion circuits 110, 114, the DC-DC converter 100 is preferably designed to operate in the range of 75 kHz to 350 kHz, and the resonant frequency $F_R$ is preferably in the range of 80 kHz to 120 kHz. When SiC MOSFET (Silicon Carbide MOSFET) are used in the AC-DC conversion circuits 110, 114, the DC-DC converter 100 is preferably designed to operate in the range of 150 kHz to 500 kHz, and the resonant frequency $F_R$ is preferably in the range of 180 kHz to 250 kHz.

As it is apparent from FIG. 3, the forward gain $G_F$ is less than one for frequencies above a certain threshold which decreases as the load R2 decreases. Besides, there is a minimum frequency, usually 75 kHz, for correctly operating the switches of the AC-DC conversion circuit 110 and the best performance occurs at the resonant frequency $F_R$, so that it is not possible to use frequency too low with respect to the resonant frequency $F_R$. Therefore, in the forward mode of operation, only the buck mode (V2<V1) may be available.

Referring to FIG. 4, an electrical model of the DC-DC converter 100 in the reverse mode of operation will now be described.

The model is the same than for FIG. 2, except that the primary electrical device 104 operates as a load R1 and the secondary electrical device 106 operates as an AC voltage source.

Therefore, the resonant tank circuit 102 has a reverse gain $G_R$ dependent on the frequency F of the AC voltage source 106 and given by:

$$G_R = \frac{V1}{V2} = \frac{1}{N} \cdot \frac{V1}{V_{INT}}$$

An example of the reverse gain $G_R$ in said resonant tank according to the prior art is illustrated on FIG. 5 as a function of the frequency F for different loads R1 (arrows indicate increase of the load R1), when the referred to primary capacitance C2' is equal to the primary capacitance C1 and the winding ratio N is equal to one.

As it can be appreciated, at the resonant frequency $F_R$ (the same than for the forward mode of operation), the curves for the different loads R1 meet at a point P', which means that the reverse gain $G_R(F_R)$ at the frequency $F_R$ is essentially independent of the load R1. To estimate the reverse gain $G_R(F_R)$, the case where the load R1 is very high is considered. In that case, the primary voltage V1 is practically the voltage across the magnetizing inductance Lm, and a voltage divider is obtained so that:

$$G_R(F_R) = \frac{1}{N} \cdot \frac{XLm}{XLm + XC2'}$$

where XLm is the reactance of the magnetizing inductance Lm and XC2' is the reactance of the referred to primary capacitance C2'.

As it is apparent from FIG. 5, the reverse gain $G_R$ for high loads remains greater than one until very high frequencies. Furthermore, the best performance occurs at the resonant frequency $F_R$, so that it is not possible to use frequency too high with respect to the resonant frequency $F_R$. Therefore, in the reverse mode of operation, the buck mode (V1<V2) is difficult to achieve.

Furthermore, by comparing FIGS. 3 and 5, it is apparent that the resonant tank circuit 102 is asymmetrical, that is to say that the forward gain $G_F$ and the reverse gain $G_R$ follows very different curves, causing problems in controlling the switches.

In order to overcome these problems, in an example of the resonant tank according to the invention, the primary circuit M1, the transformer T and the referred to primary circuit M2' are configured such that the forward gain $G_F(F_R)$ and the reverse gain $G_R(F_R)$ at the resonant frequency $F_R$ are essentially equal to one another, notably to within 5%.

In this manner, the curves for the forward gain $G_F$ and reverse gain $G_R$ are almost superposed at the resonant frequency $F_R$. The choice to superpose the forward gain $G_F$ and the reverse gain $G_R$ at the resonant frequency and not at another frequency is particularly advantageous because the curves for different loads meet at this resonant frequency $F_R$. The resonant tank circuit 102 becomes almost symmetrical, which solves at least in part the problems of an asymmetrical resonant tank circuit.

In the described example, the configuration comprises a first step in which the winding ratio N is determined according to the primary circuit M1, the magnetization circuit Mm and the referred to primary circuit M2'.

In the described example, with the layouts of the primary and referred to primary circuits M1, M2' and given that the referred to primary capacitance C2' is chosen equal to the primary capacitance C1, the forward gains $G_F(F_R)$ at the resonant frequency $F_R$ then simplifies to:

$$G_F(F_R) = N \cdot \frac{Lm}{Lm + \frac{L1}{2}}$$

This comes from the resonance equation:

$$XL1+XC1+XC2'=0$$

which, with the referred to primary capacitance C2' equal to the primary capacitance C1, leads to:

$$XC1 = -\frac{1}{2}XL1$$

In the described example, the winding ratio N is then taken essentially equal to, notably to within 5%:

$$N = \frac{Lm + \frac{L1}{2}}{Lm}$$

In practice, the number of turns N1, N2 are often integer values, so that the ratio closest to the theoretical previous value is chosen. For example, if the theoretical value of N is 14:16.3, then the turn ratio N could be chosen as 14:16.

In this manner, the forward gain $G_F(F_R)$ at the resonant frequency $F_R$ is essentially equal to one, notably to within 5%, and the reverse gain $G_R(F_R)$ at the resonant frequency $F_R$ is essentially equal to:

$$G_R(F_R) = \frac{Lm^2}{Lm^2 - \left(\frac{L1}{2}\right)^2}$$

The magnetization inductance Lm and the primary inductance L1 are chosen so that:

$$Lm^2 > 100 \cdot \left(\frac{L1}{2}\right)^2$$

In this manner, the forward gain $G_R(F_R)$ is almost equal to one, and therefore almost equal to $G_F(F_R)$.

In a second step, the secondary circuit M2 is then determined from the referred to primary circuit M2' and the determined winding ratio N.

In the described example, the secondary capacitance C2 is determined from the referred to primary capacitance C2' and the winding ratio N, according to:

$$C2 = \frac{C2'}{N^2}$$

FIG. 6 illustrates the curves of the forward gain $G_F$ and the reverse gain $G_R$ as a function of the frequency F, for different load. As explained previously, it can be seen that the forward gain $G_F(F_R)$ at the resonant frequency FR is slightly lower than one, because N1 and N2 are integer.

As it is apparent, the forward gain $G_F$ and the reverse gain $G_R$ are very similar.

It is clear that a resonant tank according to the invention allows obtaining almost symmetrical forward and reverse gains.

It should also be noted that the invention is not limited to the embodiments and alternatives described hereinabove. More specifically, one of ordinary skill in the art will realize that various modifications can be provided to the embodiments and alternatives described hereinabove, using the information disclosed herein. In the following claims, the terms used must not be interpreted as limiting the claims to the embodiments presented in this description, however must be interpreted to include all equivalents that the claims intend to cover via their formulation and the prediction of which is within reach of one of ordinary skill in the art when applying their general knowledge to the implementation of the information disclosed herein.

The invention claimed is:

1. A resonant tank circuit comprising:
   a transformer comprising primary and secondary windings magnetically coupled;
   a primary circuit having a first pair of terminals connected to the primary winding and a second pair of terminals intended to be connected to a primary electrical device; and
   a secondary circuit having a first pair of terminals connected to the secondary winding and a second pair of terminals intended to be connected to a secondary electrical device;
   wherein the transformer and the primary and secondary circuits are configured to operate in a forward mode, respectively a reverse mode, in which the primary electrical device operates as a primary AC voltage source, respectively a primary load, and the secondary electrical device operates as a secondary load, respectively a secondary AC voltage source; and
   wherein the transformer and the primary and secondary circuits have, at a resonant frequency, a forward gain, respectively a reverse gain, essentially independent of the primary load, respectively the secondary load, when operating in the forward mode, respectively the reverse mode,
   wherein the primary and secondary circuits are different one from another and the forward gain and the reverse gain at the resonant frequency are essentially equal to one another to within 5%.

2. The resonant tank circuit according to claim 1, wherein the forward gain and the reverse gain at the resonant frequency are both essentially equal to one to within 5%.

3. The resonant tank circuit according to claim 1, wherein the primary circuit comprises a primary inductance and a primary capacitance in series.

4. The resonant tank circuit according to claim 3, wherein a winding ratio of the primary and secondary windings is essentially equal, to within 5%:

$$N = \frac{Lm - (L1/2)}{Lm}$$

where N is the winding ratio, Lm is a magnetizing inductance (Lm) of the transformer across the primary winding and L1 is the primary inductance.

5. The resonant tank circuit according to claim 3, wherein a magnetizing inductance (Lm) of the transformer across the primary winding is such that:

$Lm2 > 100 \cdot (L1/2)^2$ where is the magnetizing inductance and L1 is the primary inductance.

6. The resonant tank circuit according to claim 3, wherein the secondary circuit comprises a secondary capacitance.

7. The resonant tank circuit according to claim 6, wherein the secondary circuit has essentially no inductance.

8. The resonant tank circuit according to claim 6, wherein the secondary capacitance (C2) is given by:

$C2 = C1/N^2$ where C2 is the secondary capacitance, C1 is the primary capacitance and N is the winding ratio.

9. A DC-DC converter comprising:
a resonant tank circuit according to claim 1;
a primary electrical device connected to the second pair of terminals of the primary circuit; and
a secondary electrical device connected to the second pair of terminals of the secondary circuit.

* * * * *